US011325071B2

(12) United States Patent
Hirth et al.

(10) Patent No.: US 11,325,071 B2
(45) Date of Patent: May 10, 2022

(54) CATALYTIC CONVERTER FOR TREATING EXHAUST GASES

(71) Applicant: Vitesco Technologies GMBH, Hannover (DE)

(72) Inventors: Peter Hirth, Rösrath (DE); Holger Stock, Siegburg (DE)

(73) Assignee: Vitesco Technologies GmbH, Hannover (DE)

( * ) Notice: Subject to any disclaimer, the term of this patent is extended or adjusted under 35 U.S.C. 154(b) by 101 days.

(21) Appl. No.: 16/822,061

(22) Filed: Mar. 18, 2020

(65) Prior Publication Data

US 2020/0215484 A1 Jul. 9, 2020

Related U.S. Application Data

(63) Continuation of application No. PCT/EP2018/075148, filed on Sep. 18, 2018.

(30) Foreign Application Priority Data

Sep. 18, 2017 (DE) .................... 10 2017 216 469.7

(51) Int. Cl.
*B01D 53/88* (2006.01)
*B01J 35/04* (2006.01)
*C04B 38/00* (2006.01)

(52) U.S. Cl.
CPC ............ *B01D 53/885* (2013.01); *B01J 35/04* (2013.01); *C04B 38/0009* (2013.01); *B01D 2255/902* (2013.01); *B01D 2255/903* (2013.01)

(58) Field of Classification Search
None
See application file for complete search history.

(56) References Cited

U.S. PATENT DOCUMENTS 4,297,319 A * 10/1981 Ishibashi ............ B01D 53/8631
422/114
5,987,885 A 11/1999 Kizer et al.
6,178,744 B1 1/2001 Perset
6,365,283 B1 4/2002 Bruck
(Continued)

FOREIGN PATENT DOCUMENTS

| CN | 1303321 A | 7/2001 |
| CN | 101963086 A | 2/2011 |
| DE | 2852800 A1 | 6/1979 |

(Continued)

OTHER PUBLICATIONS

Srun et al. FR2704276A1—traslated document (Year: 1993).*

(Continued)

*Primary Examiner* — Jelitza M Perez

(57) ABSTRACT

The invention relates to a catalytic converter for treating exhaust gases of an internal combustion engine, having a housing through which an exhaust gas may flow and which has an inflow side and an outflow side, wherein, in the housing, there is formed a plurality of flow channels (4, 13) which is flowed through along a main throughflow direction from the inflow side to the outflow side, wherein, in the housing, there is arranged at least one pipeline (5, 12) which is flowed through by a fluid which is independent of the exhaust gas that is caused to flow through the flow channels (4, 13).

19 Claims, 2 Drawing Sheets

(56) References Cited

U.S. PATENT DOCUMENTS 8,776,865 B2     7/2014   Gaiser

FOREIGN PATENT DOCUMENTS

| | | |
|---|---|---|
| DE | 3437477 A1 | 1/1986 |
| DE | 60113646 T2 | 3/2006 |
| FR | 2704276 A1 * | 10/1994 ........... F01N 3/2889 |
| FR | 2704276 A1 | 10/1994 |
| FR | 2772829 A1 | 6/1999 |
| JP | 2008119595 A | 5/2008 |

OTHER PUBLICATIONS

International Search Report and Written Opinion dated Nov. 15, 2018 from corresponding International Patent Application No. PCT/EP2018/075148.

* cited by examiner

CATALYTIC CONVERTER FOR TREATING EXHAUST GASES

CROSS-REFERENCE TO RELATED APPLICATIONS

This application claims priority to PCT Application PCT/EP2018/075148, filed Sep. 18, 2018, which claims priority to German Patent Application No. DE 10 2017 216 469.7, filed Sep. 18, 2017. The disclosures of the above applications are incorporated herein by reference.

FIELD OF THE INVENTION

The invention relates to a catalytic converter for treating exhaust gases of an internal combustion engine, having a housing through which an exhaust gas may flow and which has an inflow side and an outflow side, wherein, in the housing, there is formed a plurality of flow channels which is flowed through along a main throughflow direction from the inflow side to the outflow side.

BACKGROUND OF THE INVENTION

The temperature control of tube reactors, such as are used for example in chemical plants, is usually carried out via the pipe walls of the corresponding reactor. The diameter to be used is limited because it must be ensured that a sufficiently large amount of heat is transported from the interior to the pipe wall or is transported from the pipe wall into the flowing medium. A large number of thin pipes must therefore be used, which makes the production of the reactors complex and expensive.

In the case of exhaust-gas catalytic converters such as are used for example for the aftertreatment of exhaust gases of an internal combustion engine in automobiles, the concept of supplying heat or discharging heat from or to the outside has hitherto been only little used. Only electrically heatable exhaust-gas catalytic converters have hitherto been known in the prior art in order to increase the gas temperature of the exhaust gas flowing through the catalytic converter. For this purpose, metal structures are heated electrically utilizing the ohmic resistance, whereby the flowing fluid is also heated.

A problem in the case of exhaust-gas catalytic converters in automobiles is that the flow of the exhaust gas in the catalytic converter is predominantly laminar, as a result of which there is only a very small flow perpendicular to the main flow direction, as a result of which the heat transport perpendicular to the main flow direction toward the pipe walls or away from the pipe walls is possible only in narrow limits.

A disadvantage of the devices known in the prior art is that, in relation to the available structural space, it is not possible to realize a sufficiently great supply of heat or discharge of heat to dissipate, via the pipe walls, the amount of heat generated during highly exothermic reactions.

SUMMARY OF THE INVENTION

It is therefore the object of the present invention to provide a catalytic converter which makes it possible, even in the case of highly exothermic reactions, to rapidly discharge a sufficiently great amount of heat to ensure the structural integrity of the catalytic converter. At the same time, it is sought to provide a catalytic converter which has as simple and space-saving a structural form as possible.

The problem in terms of the catalytic converter is solved by a catalytic converter having the features described.

An exemplary embodiment of the invention relates to a catalytic converter for treating exhaust gases of an internal combustion engine, having a housing through which an exhaust gas may flow and which has an inflow side and an outflow side, wherein, in the housing, there is formed a plurality of flow channels which are flowed through along a main throughflow direction from the inflow side to the outflow side, wherein, in the housing, there is arranged at least one pipeline which is flowed through by a fluid which is independent of the exhaust gas that is caused to flow through the flow channels.

The flow channels in the catalytic converter may be formed for example by a honeycomb body which is formed by a layer stack of corrugated and smooth metal layers. Here, the metal layers may have a large number of different corrugated profiles, as are known from the prior art. The smooth metal layers may also be designed differently and, for example, have openings that allow flow transfer between different flow channels.

Among other things, it may be advantageous if the flow channels are designed such that exhaust gas flowing through the flow channels is diverted between multiple flow channels, as a result of which the distribution over the cross section of the honeycomb body is improved and at the same time the heat transfer owing to the formation of at least local turbulent flow sections may also be improved.

A fluid which, for example, is at a different temperature level than the exhaust gas is conveyed through the at least one pipeline, as a result of which an exchange of heat between the exhaust gas and the flowing fluid is achieved. According to the invention, at least one pipeline is provided. A plurality of pipelines which are distributed over the cross-sectional area of the honeycomb body may also advantageously be provided in order to ensure the most uniform possible heat transport over the cross section of the honeycomb body.

It is advantageous if the pipeline runs within and at least partially along one of the flow channels. This is advantageous in order to bring the pipeline into heat-conducting contact with the honeycomb body that forms the flow channels. In this way, the surface area over which the exchange of heat primarily takes place is greatly enlarged, since the flow channels in each case surrounding the pipeline, or the wall surfaces delimiting the flow channels, also assist the heat transfer.

It is also advantageous if the pipeline is flowed through by a cooling fluid. A cooling fluid is advantageous for discharging heat from the exhaust gas flowing in the catalytic converter. This may be advantageous for example in the case of highly exothermic reactions in order to prevent overheating of the catalytic converter and the honeycomb body.

Alternatively, an introduction of heat into the exhaust gas may also be generated by a fluid flowing in the pipelines. This is advantageous if processes are to take place within the catalytic converter which require a high temperature or a high temperature level in the exhaust gas. These include, for example, the process of exhaust gas catalysis in gas engines.

The cooling fluid may preferably be conveyed via a dedicated coolant circuit and cooled again after the absorption of heat. A defined heat distribution in the catalytic converter is generated by the targetedly controllable discharge of heat via the cooling fluid flowing in the pipelines. For this purpose, it is for example also conceivable to vary the diameter of the pipelines over the main axial extent of the catalytic converter or to vary the number of pipelines.

In one advantageous embodiment, for example, the number of pipelines changes with the distance to the inflow side. In this way, it is for example possible for a greater or lesser discharge of heat to be generated in the region directly adjacent to the inflow side than in the region in the vicinity of the outflow side. For this purpose, in an embodiment the pipelines may for example be introduced into the honeycomb body in the radial direction from the outside and diverted into the direction of the flow channels by a diversion.

An exemplary embodiment is characterized in that the catalytic converter has a partial region which extends from the inflow side to the outflow side and which has no pipeline.

It is desirable to achieve the highest possible temperature in the flowing exhaust gas in the region of the inflow side. In this way, it is for example possible for a catalytic conversion to take place which requires high exhaust-gas temperatures. This is advantageous if the exhaust gas is heated by a heating device, in order to have a sufficiently high temperature, before flowing into the catalytic converter according to the invention. Here, the catalytic converter may be constructed in such a way that the reaction with the exhaust gas, which requires a high temperature, takes place at the inflow side, and the cooling by contact with the pipelines only takes place further to the outflow side in the direction of the main flow direction.

It is also preferable if the pipeline is connected by brazing to the honeycomb structure that forms the flow channels. Brazing is advantageous in order to generate a permanently stable structure. In addition, the heat transfer properties of the connection regions are good in the case of brazing. The pipelines are advantageously connected along their entire extent along the main throughflow direction to the honeycomb structure.

It is furthermore advantageous if the pipeline has a round cross section and is arranged between a corrugated metal layer and a smooth metal layer in one of the wave peaks or in one of the wave troughs of the corrugated metal layer. The pipeline advantageously has a cross section adapted to the flow channels in order to ensure that the contact area between the pipeline and the honeycomb body is as large as possible. This promotes the heat transfer.

It is also expedient if the ratio between the inner circumference of the uncoated flow channel that accommodates the pipeline and the outer circumference of the pipeline lies between 1 and 2, preferably between 1.2 and 1.8.

This is advantageous in order to achieve optimum heat transfer between the fluid flowing through the flow channels and the fluid flowing through the pipelines. Here, tests have confirmed the above-stated ratio as being optimal, such that high efficiency is achieved.

It is furthermore advantageous if the ratio of the outer surface area of all pipelines to the geometric surface area of the uncoated matrix, which accommodates the pipelines and forms the flow channels, without the pipelines lies between 0.2 and 0.5, preferably between 0.25 and 0.45.

The total ratio of the outer surface area of the pipelines to the geometric surface area of the uncoated matrix is preferably in the above-stated range because the heat transfer between the fluids in the flow channels and the pipelines may take place. By maintaining the above-stated ratio, favorable efficiency for the catalytic converter is achieved, wherein the exhaust-gas temperature is kept in an optimum range for exhaust-gas aftertreatment over a broad operating range, as a result of which the function of the catalytic converter is considerably improved.

"Matrix" refers to the structure which is arranged in the housing of the catalytic converter and which is composed of a multiplicity of metal layers and which both forms the flow channels and also accommodates the pipelines, if present. In special embodiments, the matrix may also include the housing.

It is also preferable if, at the flow channels, a zone forms which is characterized by an increased flow speed and/or an improved mass transfer coefficient in a subregion of the matrix.

An increased flow speed in the flow channels is advantageous in order to permit an improved heat transfer between the fluid flowing in the flow channels and flowing in the pipeline. An improved mass transfer coefficient is also advantageous in order to achieve an improved transition between the phases of the fluid, if present.

It is also advantageous if the pipelines are positioned in the region of the end face of the matrix in the region of the zone with increased flow speed.

It is furthermore expedient if the ratio of the outer surface area of all pipelines positioned in the region of the zone with increased flow speed to the geometric surface area of the uncoated matrix, which accommodates the pipelines and forms the flow channels, without the pipelines lies between 0.05 and 0.1, preferably between 0.07 and 0.08.

It is furthermore advantageous if the pipelines have a structured inner wall, wherein elements which project from the pipe wall toward the center of the pipeline form the structured regions. A structured inner wall of the pipelines, for example protruding elements or a roughened surface, improves the heat transfer between the pipe walls and the fluid flowing in the pipe.

It is also expedient if the honeycomb structure which forms the flow channels is composed of spirally wound metal layers, wherein a plurality of wound metal layers stacked horizontally and vertically adjacent to one another and one above the other is enclosed in a housing and forms a plurality of flow channels of the catalytic converter, which flow channels are flowed through along the main throughflow direction.

Individual flow channels or a plurality of flow channels are created by spirally wound metal layers. Several of these spirally wound metal layers may then be stacked and thus form the honeycomb body. Such a structural form is advantageous because the spirally wound metal layers are easy to produce.

It is furthermore advantageous if a pipeline is arranged in the center of a spirally wound metal layer and is cohesively connected to the wound metal layer in heat-conducting fashion. An arrangement of the pipeline in the center of the wound metal layer is advantageous because, owing to the heat-conducting contact between the pipeline and the spirally wound metal layer, the entire spirally wound metal layer is used for heat transfer. The heat transfer surface area is thus targetedly made several times larger, whereby more heat is transferred.

It is furthermore expedient if the wound metal layers form a spiral with a rectangular cross section. A rectangular or ideally square design of the wound metal layer is advantageous in order to arrange a likewise rectangular or square pipeline in the center. Rectangular elements may also be stacked and joined together to form a larger composite, for example a honeycomb body.

Advantageous developments of the present invention are described in the following description of the figures.

Further advantages and features of the present invention become apparent from the following description of preferred embodiments with reference to the attached Figures. It is understood that individual embodiments shown in the respective Figures may have features that may also be used in other embodiments, even if this is not explicitly mentioned, provided that this has not been ruled out on the basis of technical circumstances or explicitly.

Further areas of applicability of the present invention will become apparent from the detailed description provided hereinafter. It should be understood that the detailed description and specific examples, while indicating the preferred embodiment of the invention, are intended for purposes of illustration only and are not intended to limit the scope of the invention.

BRIEF DESCRIPTION OF THE DRAWINGS

The invention will be explained in detail in the following text on the basis of exemplary embodiments with reference to the drawings, in which.

DETAILED DESCRIPTION OF THE PREFERRED EMBODIMENTS

The following description of the preferred embodiment(s) is merely exemplary in nature and is in no way intended to limit the invention, its application, or uses.

Figure 1:
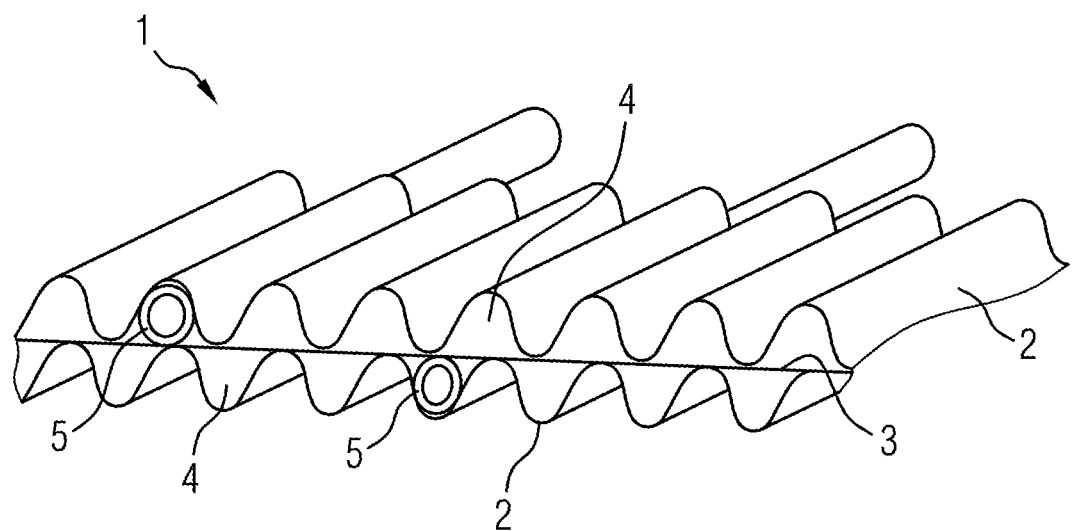
FIG. 1 shows a perspective view of a layer stack which is composed of several corrugated metal layers, between which metallic smooth layers are arranged.

FIG. 1 shows a perspective view of a layer stack 1 which is formed from multiple corrugated metal layers 2 and smooth metal layers 3. Here, the construction substantially corresponds to the construction of a conventional honeycomb body formed from a stack of multiple metal layers.

Between the corrugated metal layers 2 and the smooth metal layers 3, there are formed flow channels 4 through which the exhaust gas may flow. In the exemplary embodiment of FIG. 1, in each case one pipeline 5 has been placed into two of the flow channels 4, through which pipeline a second fluid may be conveyed, for example for the purposes of discharging heat from the exhaust gas to the fluid or for transporting heat from the fluid to the exhaust gas.

The pipelines 5 run along the respective flow channels 4, whereby the flow channels 4 in question cannot be flowed through by exhaust gas. The honeycomb body thus has a number of flow channels 4 reduced by the number of pipelines 5.

In the illustration in FIG. 1, the pipelines protrude along their main axial extent beyond the layer stack 1 formed by the corrugated metal layers 2 and the smooth metal layers 3. This serves for illustrating the construction. In the practical application, the pipelines 5 will preferably be at most as long as the layer stack.

Figure 2:
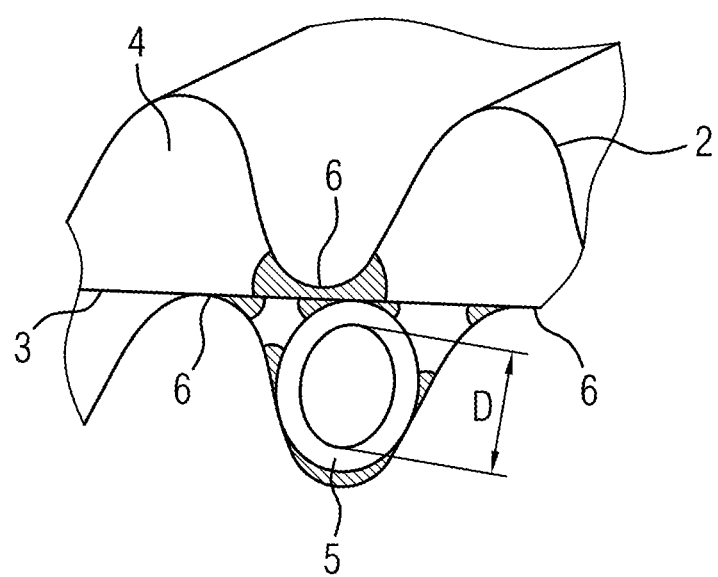
FIG. 2 shows a detail view of the layer stack from FIG. 1, wherein a pipeline inserted into a wave trough of the corrugated metal layer is illustrated.

FIG. 2 shows a detail view of a pipeline 5 in one of the flow channels 4. It is seen here that the corrugated metal layers 2 and the smooth metal layers 3 are cohesively connected to one another by the solder introduced into the contact regions 6. It is seen in FIG. 2 that gaps or free spaces to the metal layers 2, 3 are still formed around the pipeline 5. In a practical embodiment, these are generally, if present at all, so small that only very little or no exhaust gas may flow through them.

The pipeline 5 has an inner diameter D which is selected such that the pipeline 5 comes to lie against the metal layers 2, 3 over the greatest possible area. By way of as large a contact area as possible, it is also possible for the maximum amount of heat that is transmitted to be increased.

Figure 3:
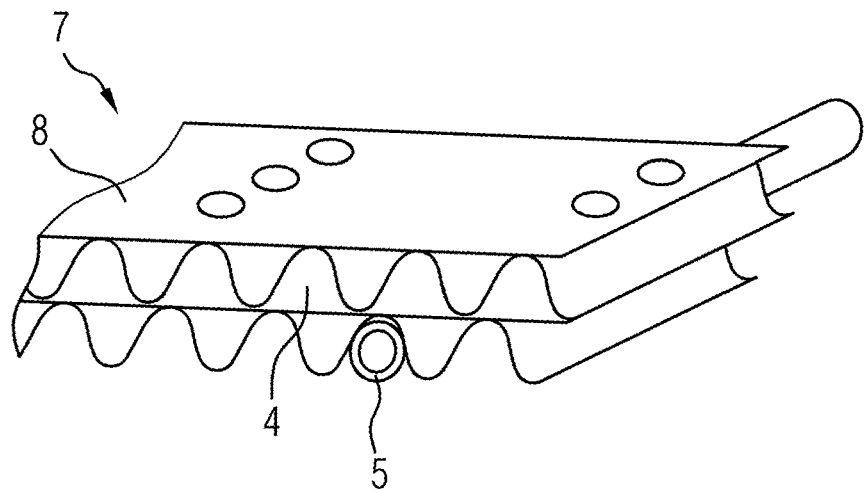
FIG. 3 shows a perspective view of a layer stack, wherein the smooth layers have a different design, which permits a flow transfer of the exhaust gas between mutually adjacent flow channels.

FIG. 3 shows a layer stack 7 which, by contrast to the layer stack 1 of FIG. 2, has smooth layers 8 of a different design. This serves substantially for illustrating that the layer stack may be designed in a variety of ways irrespective of the introduction of the pipelines 5. Different metal layers may be used, which lead to an alternative configuration of the flow channels.

Figure 4:
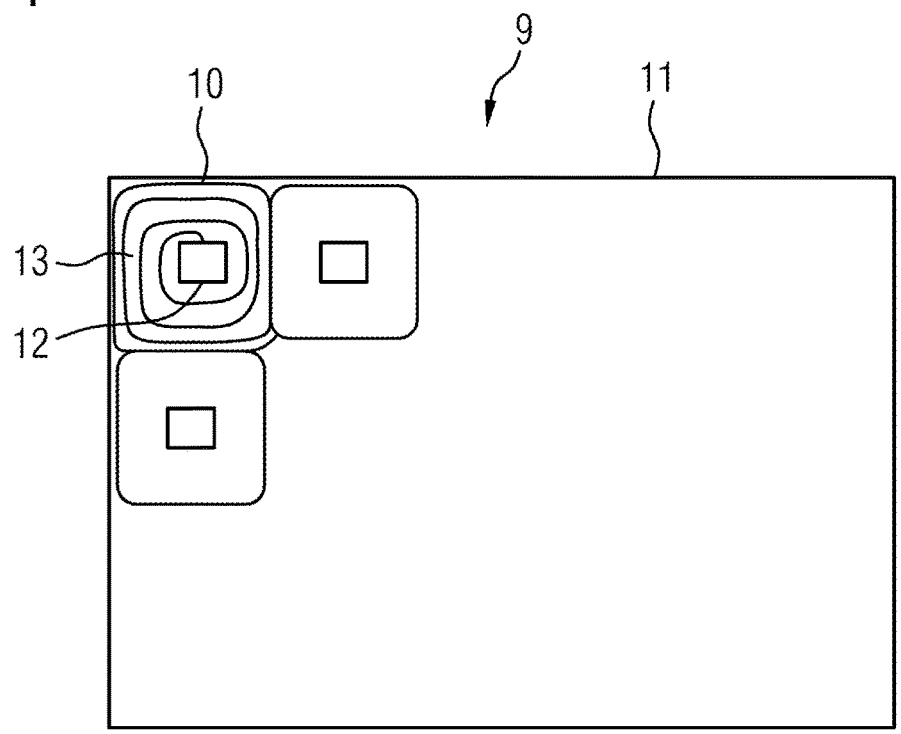
FIG. 4 shows a sectional view through a rectangular catalytic converter, wherein the flow channels are formed by metal layers wound in rectangular fashion, which metal layers are arranged adjacent to one another and stacked one above the other.

FIG. 4 shows an alternative exemplary embodiment of a layer stack 9, wherein a plurality of metal layers 10 wound in a spiral are arranged within a housing 11.

Arranged in the center of a spirally wound metal layer 10 is a pipeline 12, which is connected in heat-conducting fashion to the metal layer 10. In the exemplary embodiment of FIG. 4, the metal layer 10 is wound in rectangular form and the pipeline 12 has a rectangular cross section. The flow channels for the exhaust gas are formed between the respectively mutually adjacently arranged tiers of the wound metal layer 10.

The selection of metal layers wound in rectangular form is advantageous for catalytic converters with a rectangular housing.

The different features of the individual exemplary embodiments may also be combined with one another. The exemplary embodiments in FIGS. 1 to 4 are not of a limiting nature and serve for illustrating the concept of the invention.

The description of the invention is merely exemplary in nature and, thus, variations that do not depart from the gist of the invention are intended to be within the scope of the invention. Such variations are not to be regarded as a departure from the spirit and scope of the invention.

What is claimed is:

1. A catalytic converter for treating exhaust gases of an internal combustion engine, comprising:
   a housing through which an exhaust gas may flow, the housing having an inflow side and an outflow side;
   a plurality of flow channels formed as part of the housing, through which the exhaust gas may flow through along a main throughflow direction from the inflow side to the outflow side; and
   at least one pipeline arranged in the housing;
   a honeycomb structure, the honeycomb structure forming the plurality of flow channels;
   wherein a fluid, which is independent of the exhaust gas, flows through the at least one pipeline;
   wherein the at least one pipeline is connected by brazing to the honeycomb structure.

2. The catalytic converter of claim 1, wherein the at least one pipeline runs within and at least partially along one of the plurality of flow channels.

3. The catalytic converter of claim 1, wherein the at least one pipeline is flowed through by a cooling fluid.

4. The catalytic converter of claim 1, further comprising a partial region which extends from the inflow side to the outflow side.

5. The catalytic converter of claim 1, the honeycomb structure further comprising:
at least one corrugated metal layer;
at least one wave peak being part of the corrugated metal layer;
at least one wave trough being part of the corrugated metal layer;
at least one smooth layer connected to the at least one corrugated metal layer;
wherein the at least one pipeline has a round cross section and is arranged between the smooth metal layer and one of the at least one wave peak or the at least one trough.

6. The catalytic converter of claim 5, further comprising at least one uncoated flow channel formed by the at least one wave peak and the at least one wave trough, wherein the ratio between the inner circumference of the at least one uncoated flow channel that accommodates the at least one pipeline and the outer circumference of the at least one pipeline lies between 1 and 2.

7. The catalytic converter of claim 6, wherein the ratio between the inner circumference of the uncoated flow channel that accommodates the at least one pipeline and the outer circumference of the at least one pipeline lies between 1.2 and 1.8.

8. The catalytic converter of claim 5, the at least one pipeline further comprising a plurality of pipelines, and the honeycomb structure further comprising an uncoated matrix, wherein the ratio of the outer surface area of the plurality of pipelines to the geometric surface area of the uncoated matrix, which accommodates the plurality of pipelines and forms the flow channels, without the plurality of pipelines lies between 0.2 and 0.5.

9. The catalytic converter of claim 8, wherein the ratio of the outer surface area of the plurality of pipelines to the geometric surface area of the uncoated matrix, which accommodates the plurality of pipelines and forms the flow channels, without the plurality of pipelines lies between 0.25 and 0.45.

10. The catalytic converter of claim 8, further comprising a zone formed at the plurality of flow channels.

11. The catalytic converter of claim 10, the zone further comprising an improved mass transfer coefficient in a subregion of the uncoated matrix.

12. The catalytic converter of claim 10, the zone further comprising an increased flow speed in a subregion of the uncoated matrix.

13. The catalytic converter of claim 12, wherein the at least one pipeline is positioned in a region of an end face of the zone with the increased flow speed.

14. The catalytic converter of claim 13, wherein the ratio of the outer surface area of the at least one pipeline positioned in the region of the end face of the zone with the increased flow speed to the geometric surface area of the uncoated matrix, which accommodates the at least one pipeline and forms the plurality of flow channels, without the at least one pipeline lies between 0.05 and 0.1.

15. The catalytic converter of claim 14, wherein the ratio of the outer surface area of the at least one pipeline positioned in the region of the end face of the zone with the increased flow speed to the geometric surface area of the uncoated matrix, which accommodates the at least one pipeline and forms the plurality of flow channels, without the at least one pipeline lies between 0.07 and 0.08.

16. The catalytic converter of claim 1, the honeycomb structure further comprising:
a plurality of spirally wound metal layers; and
a housing, wherein the plurality of spirally wound metal layers is stacked horizontally and vertically adjacent to one another and one above the other such that the plurality of spirally wound metal layers is enclosed in the housing and forms the plurality of flow channels.

17. The catalytic converter of claim 16, wherein the at least one pipeline is arranged in the center of the plurality of spirally wound metal layers.

18. The catalytic converter of claim 17, wherein the at least one pipeline is cohesively connected to the plurality of spirally wound metal layers in heat-conducting fashion.

19. The catalytic converter of claim 16, the plurality of spirally wound metal layers further comprising a spiral with a rectangular cross section.

* * * * *